United States Patent Office 3,188,324
Patented June 8, 1965

3,188,324
NEOPENTYL-SUBSTITUTED EPOXY ALCOHOLS AND CHLORIDES
Seymour H. Patinkin, Chicago, Robert R. Chambers, Homewood, and Russell Wagner Walker, Lansing, Ill., assignors, by mesne assignments, to Sinclair Research, Inc., New York, N.Y., a corporation of Delaware
No Drawing. Original application Nov. 19, 1958, Ser. No. 774,814. Divided and this application Feb. 1, 1960, Ser. No. 5,624
5 Claims. (Cl. 260—348)

The present invention relates to novel tertiary alkyl epoxy compounds corresponding to the general structural formula $$(CH_3)_3C—R'—X$$

wherein X is selected from the group consisting of hydroxy and halogen, e.g., chlorine, and R' is a divalent radical selected from the group consisting of

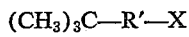

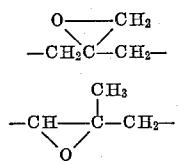

and

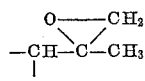

This application is a division of application Serial No. 774,814, filed November 19, 1958, now abandoned. The novel compounds corresponding to the above formula are useful as intermediates in the production of phthalic acid esters, e.g., the glycidyl phthalates described in the above-noted application, in forming various useful polymeric materials, and as stabilizers or plasticizers in, for instance, vinyl chloride polymers and polyethylene. They can be used to co-polymerize with other oxirane compounds such as ethylene oxide, propylene oxide, butylene oxide or styrene oxide to form other families of polymers with many potential uses.

Novel epoxy-hydroxy compounds of the present invention corresponding to the formula $$(CH_3)_3C—R'—OH$$

wherein R' has the same meaning previously attached, undergo polymerization readily with acidic or basic catalysts to form new and useful polymers. The novel epoxy-hydroxy compounds include 2-neopentyl-, 2-methyl-3-tertiary butyl-, and 1-tertiary butyl-2-methyl-glycidol.

The novel epoxy hydroxy compounds, e.g., 2-neopentyl glycidol, as monomers provide polymers with a tertiary alkyl chain and also a free hydroxyl group. The alkyl chain may provide hydrophobic properties to the product. The hydroxyl groups which are incorporated in the polymer by use of this monomer may be used to cross-link the polymer with agents such as diisocyanates. They may also be esterified with fatty acids or reacted with other mono functional organic compounds to provide another means for modifying properties of the polymers. This monomer represents an advance over the prior art in that the principal homolog glycidol is so reactive that its polymerization is very difficult to control. The 2-neopentyl glycidol in contrast, for instance, is much less reactive and polymerizes in a readily controllable fashion.

The novel epoxy hydroxy compounds, e.g., 2-neopentyl glycidol, can be conveniently made by reacting, for instance, 2-neopentyl allyl alcohol with peracetic acid. This reaction is generally conducted in acetic acid solution and proceeds readily, in accordance with the following equations:

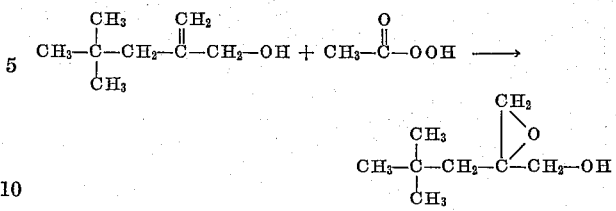

Other epoxidation reagents such as hydrogen peroxide in acetic acid with catalysts such as sulfuric acid or ionic exchange resin can also be used. Epoxidation of the isooctenyl alcohol with 40 percent peracetic acid in acetic acid may be run under the following conditions.

| | Range | Preferred Range |
|---|---|---|
| Temperature, °C | −30 to 100 | 0 to 30. |
| Time, as required to obtain 80% | 1 min. to 10 hrs. | |
| Weight, percent | 20 to 60 | 40. |

Peroxidation of a mixture of 2-neopentyl allylic alcohol and another isomer such as 2,4,4-trimethylpent-2-ene-1-ol, which can be obtained by hydrolyzing chlorinated diisobutylene, produce a mixture of the novel epoxy hydroxy compounds which are polymerizable as a mixture. Other similar mixtures of the novel epoxy hydroxy compounds may be prepared by peroxidation of allyl alcohols produced by chlorination and hydrolysis of other olefinic materials.

As noted above, the novel epoxy hydroxy compounds can be conveniently made from the corresponding allyl alcohols. However, it is also possible to make them by hydrolysis of the novel corresponding epoxy halogen compounds of the present invention in accordance with the following equations:

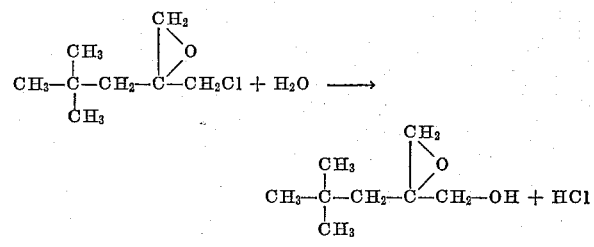

The alkyl substituted allyl alcohols in turn may be obtained from the corresponding olefins by (1) direct oxidation in some cases, (2) oxidation in the presence of acetic acid to form the allyl acetate and hydrolysis of this and (3) chlorination and hydrolysis of the resultant allyl chloride.

Novel epoxy halogen compounds of the present invention corresponding to the formula $$(CH_3)_3—C—R'—A$$

wherein A is halogen, e.g., Cl, F, I, Br, and R' has the same meaning previously attached, can also be employed as monomers. For instance, 2-neopentyl epichlorohydrin as a monomer permits the formulation of Epon-type resins by reaction with a diphenol such as bisphenol-A to provide resins corresponding to the polymeric formula

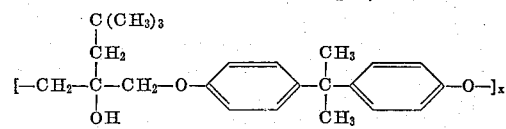

which are chemically resistant. The cured polymers also have good dimensional stability and excellent adhesiveness. Properties such as flexibility or water resistance can be increased by adding alkyl groups at intervals along the polymer chain. This can be done by esterifying the remaining hydroxyl group with an organic acid, alkylating the phenol, and further alkylating the epichlorohydrin molecule, for instance, with an alkyl group of more than 3 carbon atoms, e.g., in the 2 position or alkyl substituents in the 1 or 3 position. The novel epoxy halogen compounds can also be used in the production of epoxidized esters by the reaction with the sodium salt of a carboxylic acid, for example, for use as plasticizers, particularly for plastics derived from vinyl chloride.

The novel epoxy halogen compounds can be conveniently and economically prepared by epoxidation of isooctenyl halide, e.g., chloride, with a peracid. Peracetic acid can be employed and is generally used in acetic acid solution under the following conditions:

|  | Range | Preferred Range |
|---|---|---|
| Temperature, °C | 0–100 | 45 to 65. |
| Time, Hours | 48–0.5 | 2 to 1. |
| Peracetic Wt. percent in Acetic Acid | 20 to 60 | 40. |

The novel epoxy halogen compounds include 2-neopentyl-, 2-methyl-3-tertiary-butyl-, and 1-tertiary-butyl-2-methyl-epichlorohydrins. A mixture of isomeric isooctenyl chlorides could lead on epoxidation to these three isomeric epichlorohydrins. Among these compounds, the 2-neopentyl epichlorohydrin is formed preferentially when the isooctenyl halide is epoxidized with peracetic acid.

Under the reaction conditions employed, about 40 percent of the isooctenyl chloride was converted to 2-neopentyl epichlorohydrin. Indications are that conversion could be improved by a longer reaction time at 55° C. or a somewhat higher temperature. At the low conversion level, however, little or no by-products were formed and on recycle, assuming equilibration of the chloride isomers through isomerization, an ultimate yield approaching quantitative yields should be obtainable.

In order to more fully illustrate the compounds of the present invention and their manner of preparation, reference is made to the following specific examples none of which, however, is to be considered as limiting the scope of the instant invention.

EXAMPLE I

*Epoxidized isooctenyl alcohol (2-neopentyl glycidol)*

200 grams (1.56 mols) of isooctenyl alcohol prepared as described in application Serial No. 347,222, filed April 7, 1953, now U.S. Patent 2,885,445, and 20 grams of sodium acetate were charged to a 1-liter 4-necked flask equipped with a stirrer, reflux condenser, thermometer and addition funnel. 305 grams (1.61 mols) of 40 percent peracetic acid were added through the addition funnel during a 2-hour period while stirring the reaction mixture at a temperature of 0 to 20° C. After the addition of the peracetic acid was completed, the reaction mixture was allowed to warm to room temperature and the stirring was continued at this temperature for 5.5 hours longer. By the end of this period, 96.5% of the peracetic acid had been consumed. The reaction mixture was poured into cold water and then extracted with ether. The ether extract was washed with water, dried with anhydrous magnesium sulfate, filtered, evaporated and topped under vacuum, leaving 170 grams of a colorless liquid product. This product was distilled under a pressure of about 1.5 mm. of Hg and about 60 percent of the product was collected at a temperature of about 42 to 45° C. This 42 to 45° C. cut analyzed as follows:

|  | Found | Theory |
|---|---|---|
| Refractive Index $N_d^{20}$ | 1.4427 | |
| Sp. Gr. $_4^{20}$ | .9504 | |
| Iodine No | 0.0 | 0.0 |
| Percent C | 66.6 | 66.7 |
| Percent H | 11.8 | 11.1 |
| Percent $O_2$, by difference | 21.6 | 22.2 |

Infrared analysis showed a strong epoxide bond.

This epoxidized product can be transesterified with for instance dimethyl phthalate substantially as described in Example I of the above-mentioned application to yield the corresponding ester.

EXAMPLE II

*Preparation of 2-neopentyl epichlorohydrin*

86 grams (0.587 mols) of isooctenyl chloride prepared substantially as described in U.S. Patent No. 2,783,285 and 5.6 grams (0.07 mol) of sodium acetate were added to a 3-necked fluted round bottom flask equipped with a stirrer, water cooled condenser and dropping funnel. While stirring the mixture, 46 grams (0.605 mol) of 40 percent peracetic acid were added dropwise over a 1.5 hour period. The resulting mixture was then stirred for an additional 3 hours while maintaining the temperature at about 25° C. At the end of this period the temperature was increased to about 55° C. and held there for an additional hour. Stirring was then discontinued, the reaction mixture cooled to 25° C. and the layers separated. The upper layer was washed three times with 25 cc. of water per wash, and dried over magnesium sulfate. 86 grams of the product were fractionated at a pressure of about 2.5 mm. of Hg and 30 grams of a water white liquid boiling at about 65° C. were removed. About 50 grams of unreacted isooctenyl chloride were also recovered, indicating very little by-product formation. Hence ultimate yields approaching 100% can be obtained by employing recycle. Infrared spectrometric analysis and elemental analysis indicated that this cut was the desired epichlorohydrin. Analysis was as follows:

|  | Found, Wt. Percent | Theory, Wt. Percent |
|---|---|---|
| C | 59.0 | 58.86 |
| H | 9.2 | 8.93 |
| Cl | 21.8 | 22.20 |
| $O_2$, by difference | 10.0 | 10.01 |
| Refractive Index $N_D^{25}$ | 1.4420 | |

Oxirane oxygen was identified quantitatively by infrared analysis. The infrared analysis indicates the epoxidation of isooctenyl chloride yields 1-chloro-2,3-epoxy-2-neopentyl propane (2-neopentyl epichlorohydrin) selectively.

This compound, i.e., 2-neopentyl epichlorohydrin is readily hydrolyzable to isooctenyl glycidol by heating in aqueous solution in the presence of HCl and an acceptor such as pyridine. The epichlorohydrin need not, of course, be taken to the glycidol in order to obtain the glycidyl esters described in the above application but rather the epichlorohydrin can be taken directly to the phthalate esters described in the above-noted application by reacting them with, for instance, the disodium salt of phthalic acid.

It is claimed:
1. Compounds of the formula $$(CH_3)_3C-R'-X$$

wherein X is selected from the group consisting of hydroxy and chlorine and R' is a radical selected from the group consisting of

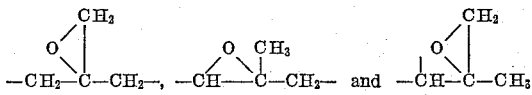

2. Compounds of the formula $$(CH_3)_3C-R'-OH$$

wherein R' is a radical selected from the group consisting of

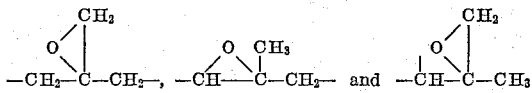

3. Compounds of the formula $$(CH_3)_3C-R'-Cl$$

wherein R' is a radical selected from the group consisting of

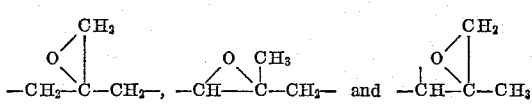

4. 2-neopentyl glycidol.
5. 2-neopentyl epichlorohydrin.

References Cited by the Examiner

UNITED STATES PATENTS

| | | | |
|---|---|---|---|
| 2,515,142 | 7/50 | Stroh | 260—348 X |
| 2,524,432 | 10/50 | Dorough | 260—348 |
| 2,699,434 | 1/55 | Turck | 260—31.8 |
| 2,769,798 | 11/56 | Meis et al. | 260—348 X |
| 2,772,296 | 11/56 | Mueller | 260—348 |
| 2,792,417 | 5/57 | Dean | 260—475 |
| 2,885,445 | 5/59 | Chambers et al. | 260—640 |
| 2,914,507 | 11/59 | Martin | 260—348 |

FOREIGN PATENTS

| | | |
|---|---|---|
| 559,078 | 6/58 | Canada. |
| 821,915 | 9/37 | France. |
| 1,123,683 | 6/56 | France. |

OTHER REFERENCES

Swern, "Organic Peracids," Chem. Reviews, vol. 45, 1949, pages 1–68 (pages 16 and 18 relied on).

IRVING MARCUS, *Primary Examiner.*

WALTER A. MODANCE, *Examiner.*